United States Patent
Wang et al.

(10) Patent No.: US 12,523,978 B2
(45) Date of Patent: Jan. 13, 2026

(54) GRAPH NEURAL NETWORK BASED PLC CONTROL LOGIC AUTOMATIC INSPECTION METHOD

(71) Applicant: UDMTEK CO., LTD., Suwon-Si (KR)

(72) Inventors: Gi Nam Wang, Yongin-Si (KR); Jun Pyo Park, Suwon-Si (KR); Sang Chul Yoo, Osan-Si (KR); Kang Hee Han, Suwon-Si (KR); Seung Woo Han, Hwaseong-Si (KR); Yeon Dong Kim, Suwon-si (KR); Nam Ki Kim, Suwon-Si (KR)

(73) Assignee: UDMTEK CO., LTD., Suwon-Si (KR)

( * ) Notice: Subject to any disclaimer, the term of this patent is extended or adjusted under 35 U.S.C. 154(b) by 11 days.

(21) Appl. No.: 17/800,431

(22) PCT Filed: Nov. 12, 2021

(86) PCT No.: PCT/KR2021/016488
§ 371 (c)(1),
(2) Date: Aug. 17, 2022

(87) PCT Pub. No.: WO2023/277274
PCT Pub. Date: Jan. 5, 2023

(65) Prior Publication Data
US 2024/0427305 A1 Dec. 26, 2024

(30) Foreign Application Priority Data
Jul. 2, 2021 (KR) .......................... 10-2021-0087128

(51) Int. Cl.
*G05B 19/05* (2006.01)
*G06N 3/08* (2023.01)

(52) U.S. Cl.
CPC ......... *G05B 19/058* (2013.01); *G05B 19/056* (2013.01); *G06N 3/08* (2013.01); *G05B 19/05* (2013.01)

(58) Field of Classification Search
USPC ............................................................. 700/1
See application file for complete search history.

(56) References Cited

U.S. PATENT DOCUMENTS

| | | | |
|---|---|---|---|
| 2018/0348728 A1* | 12/2018 | Ota | G06F 17/15 |
| 2019/0227513 A1* | 7/2019 | Cobb | G05B 19/056 |

(Continued)

FOREIGN PATENT DOCUMENTS

| | | |
|---|---|---|
| KR | 20210018384 A | 2/2021 |
| KR | 20210040316 A | 4/2021 |

OTHER PUBLICATIONS

Yoo et al., "Graph Neural Network based PLC Control Logic Automatic Inspection Method" Korean Institute of Industrial Engineers, Jun. 2, 2021, pp. 5890-5895 (Year: 2021).*

(Continued)

*Primary Examiner* — Emilio J Saavedra
(74) *Attorney, Agent, or Firm* — Osha Bergman Watanabe & Burton LLP

(57) ABSTRACT

A method of inspecting a programmable logic controller (PLC) control logic using a graphic neural network (GNN) generally includes three operations: a data preprocessing operation for a GNN, an operation of predicting whether tags are connected, and an operation of verifying suitability of edge connections between tags. As a result, a graph is generated from a PLC control logic and input to a link prediction model to find an incorrect connection in the PLC control logic. Subsequently, a result graph output through the link prediction is input to a trained model to verify edge (Continued)

connection suitability between tags. Then, it may be finally verified whether tags are connected in the PLC control logic.

9 Claims, 13 Drawing Sheets

(56) References Cited

U.S. PATENT DOCUMENTS

| | | |
|---|---|---|
| 2021/0081717 A1 | 3/2021 | Creed et al. |
| 2021/0209446 A1* | 7/2021 | Shi .......................... G06N 3/08 |
| 2021/0303448 A1* | 9/2021 | Subramanian Rajalakshmi .......... G06F 11/3698 |

OTHER PUBLICATIONS

International Search Report issued in Application No. PCT/KR2021/016488, mailed on Mar. 23, 2022 (3 pages).

Yoo et al.; "Graph Neural Network based on PLC Control Logic Automatic Inspection Method"; Korean Society for Precision Engineering; Jun. 2021 (7 pages).

Park et al.; "Plant Model Generation for PLC Simulation;" Korean Society of Industrial Engineers; vol. 373; Nov. 2008 (3 pages).

Munikoti et al.; Graph Neural Network Based on Approximation of Node Resiliency in Complex Networks; Cornell University; Dec. 2020 (8 pages).

Office Action issued in Korean Application No. 10-2021-0087128, mailed on Dec. 1, 2022 (13 pages).

"Graph Neural Network based PLC Control Logic Automatic Inspection Method", Korean Institute of Industrial Engineers, Jun. 2, 2021, pp. 5890-5895.

* cited by examiner

[Fig. 1]
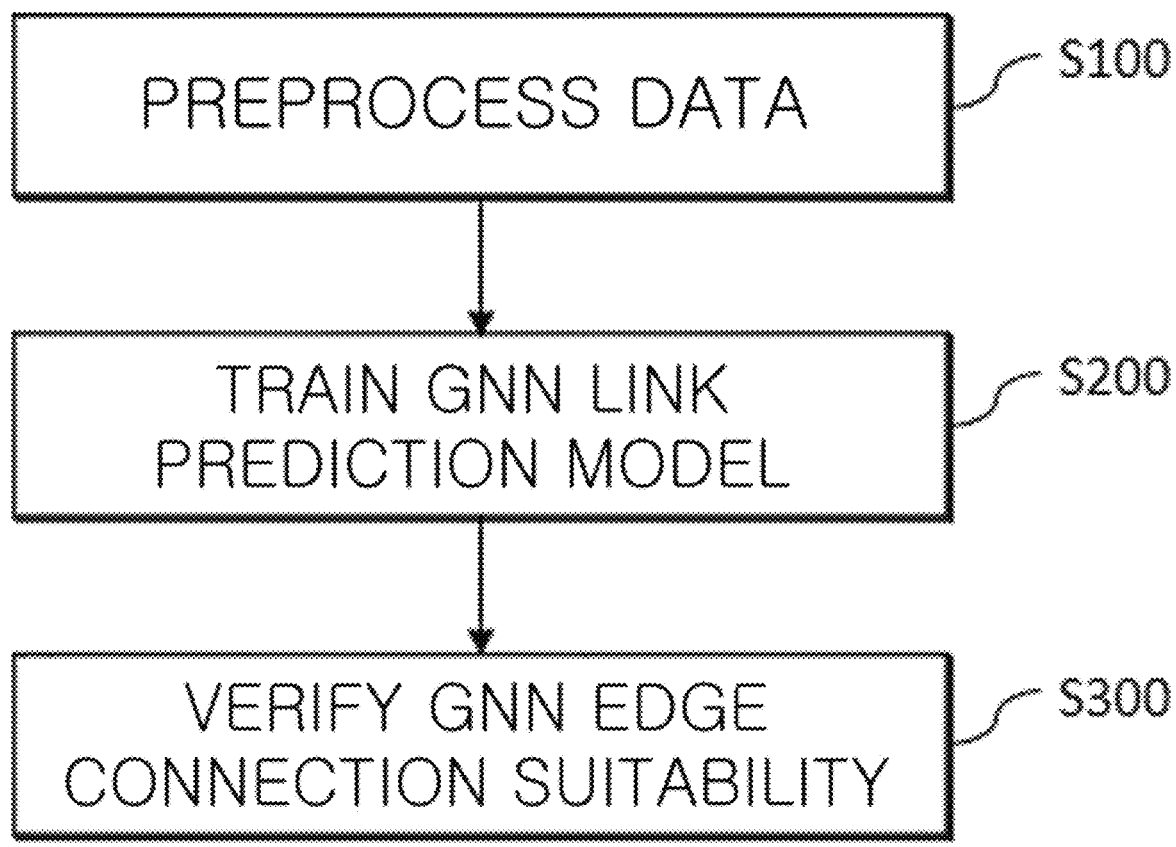

[Fig. 2]
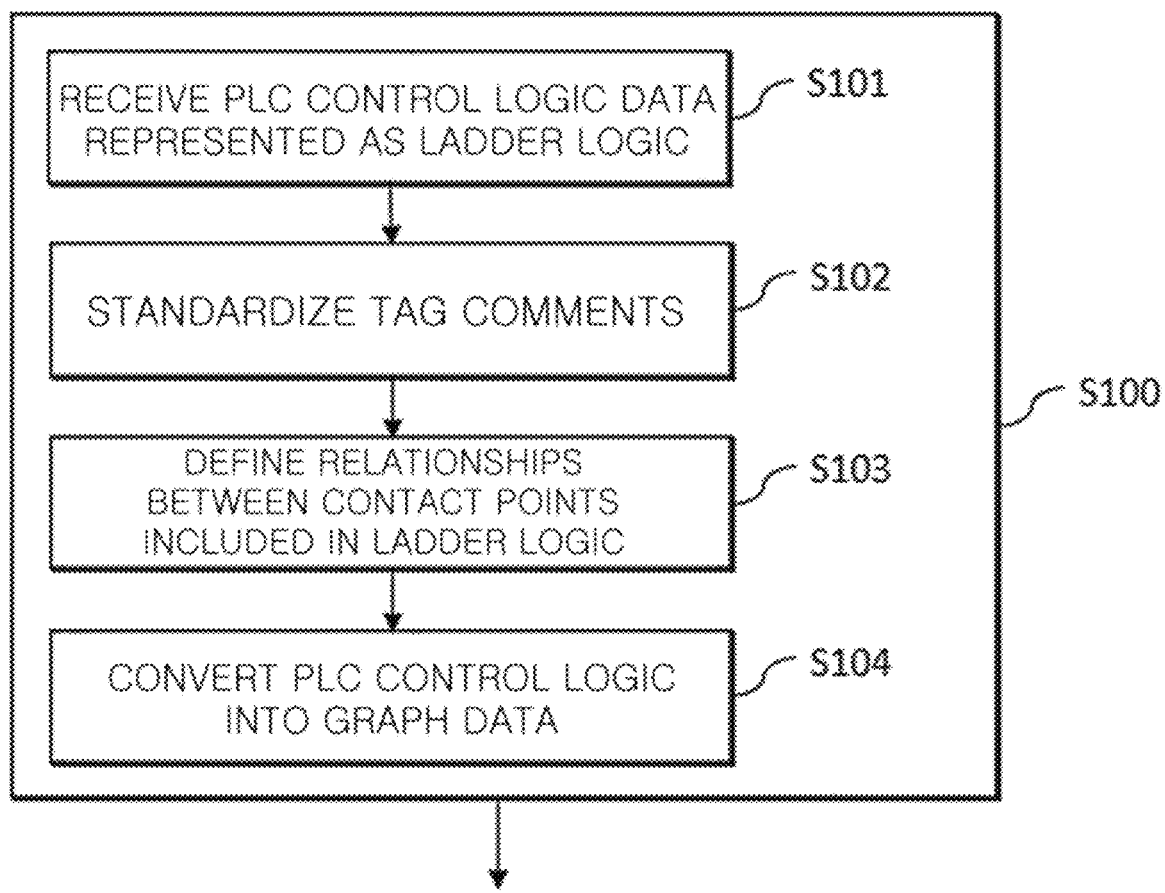

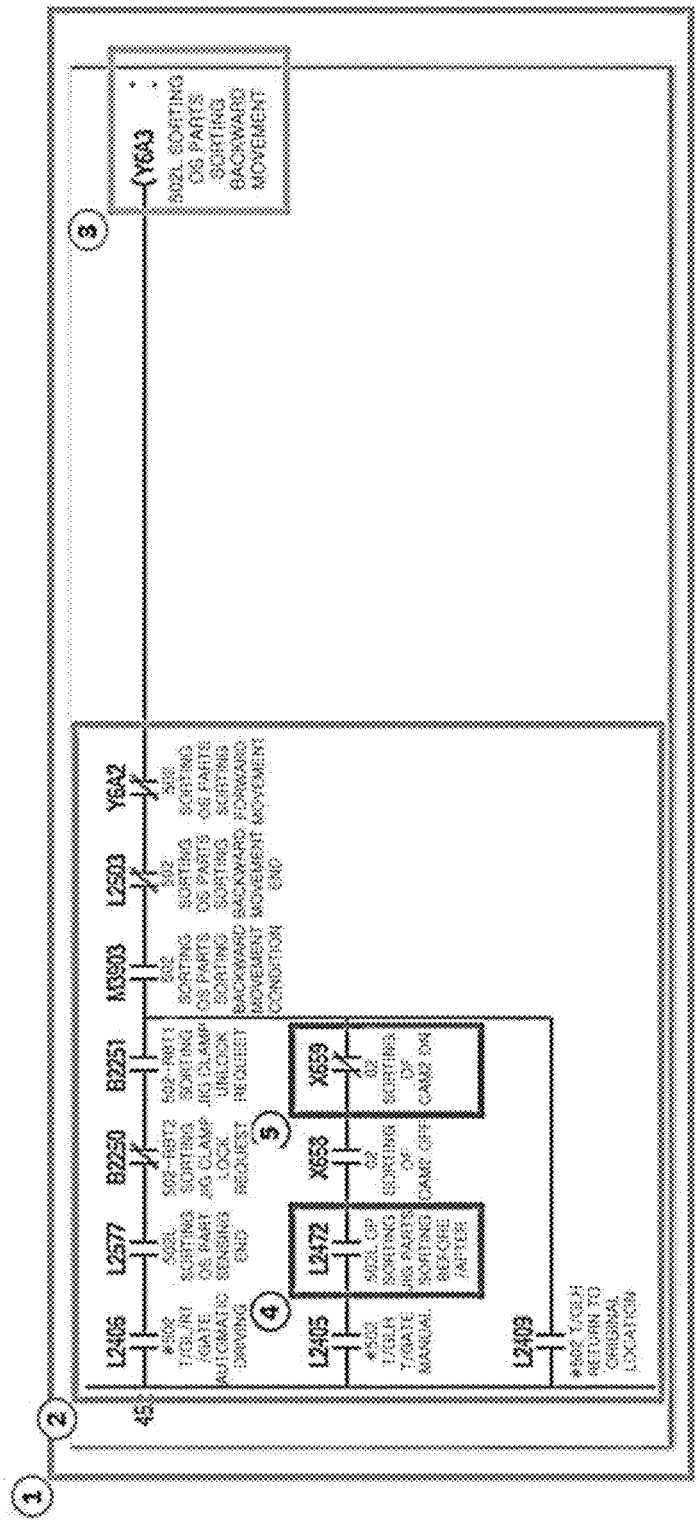
[Fig. 3]

[Fig. 6]
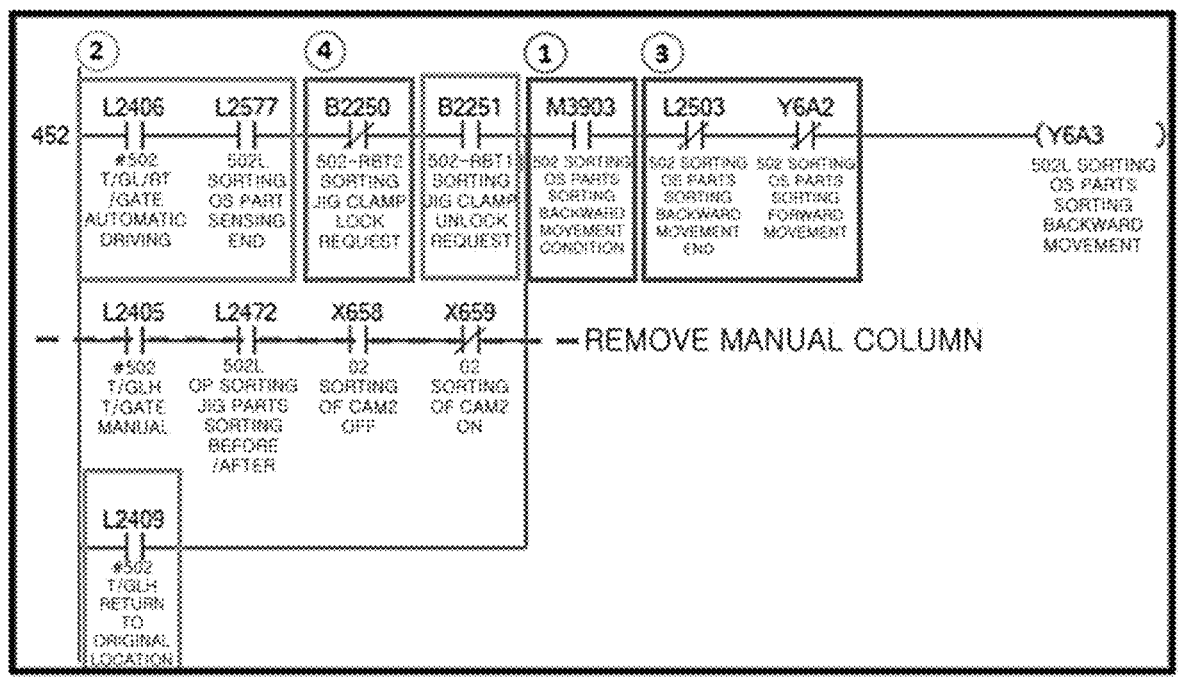

[Fig. 7]
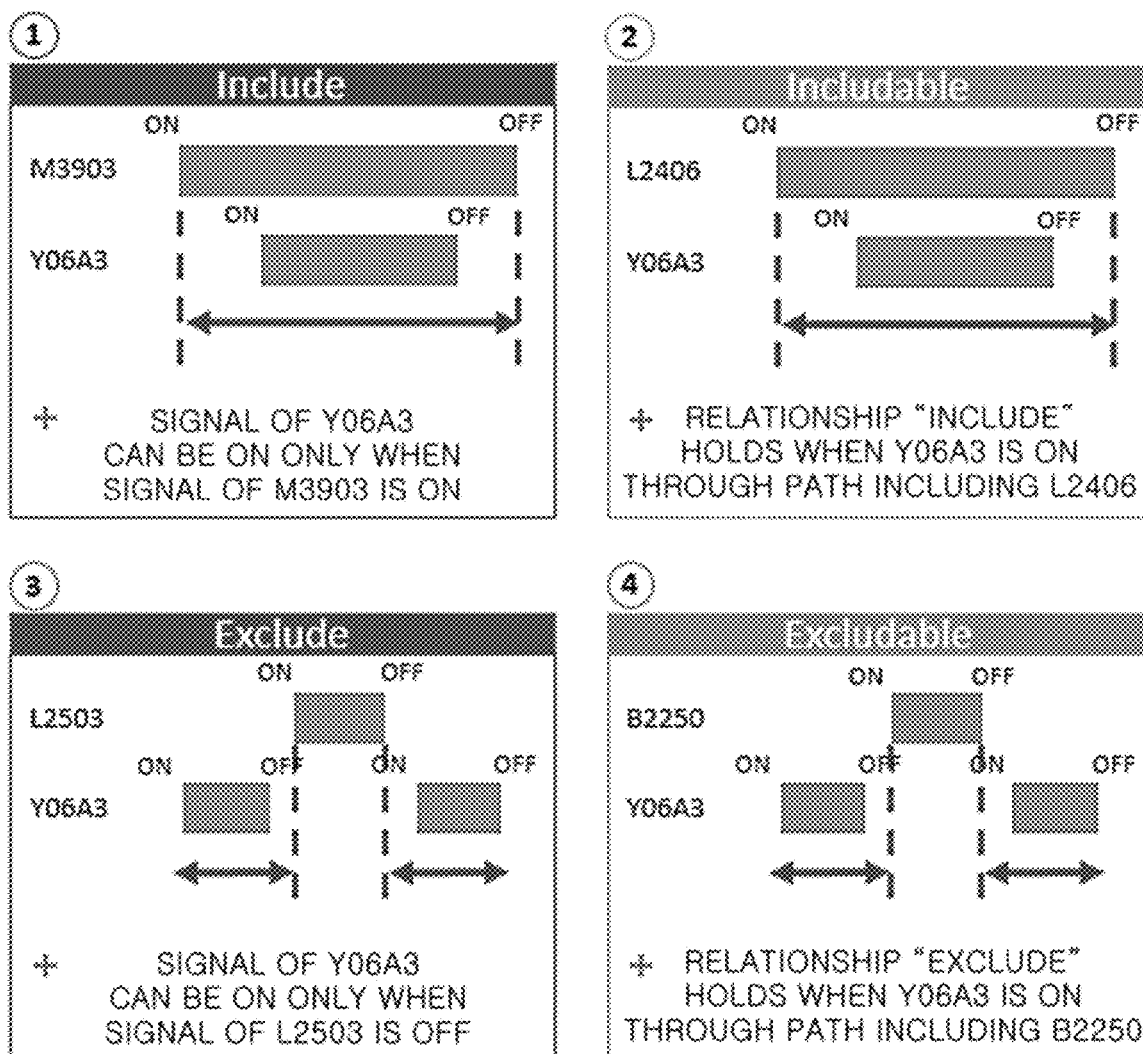

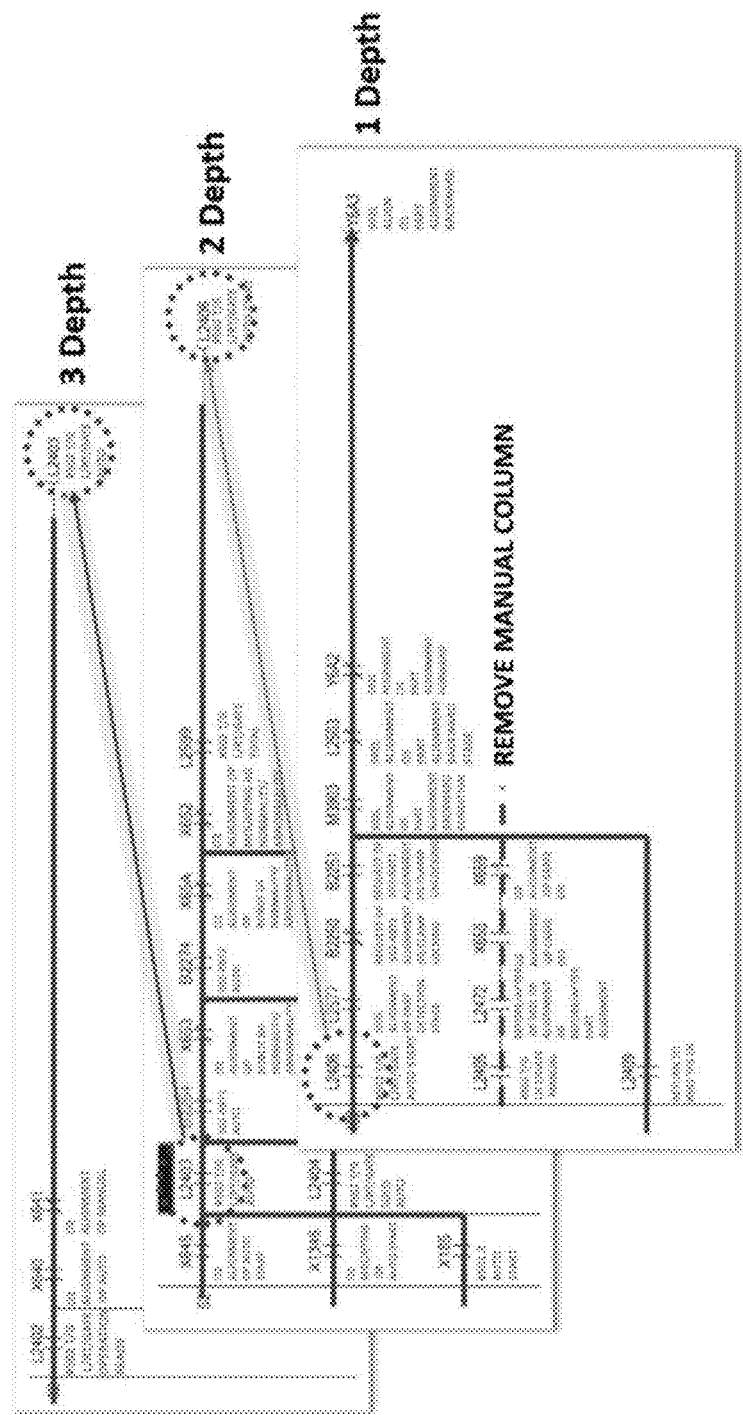
[Fig. 8]

[Fig. 9]
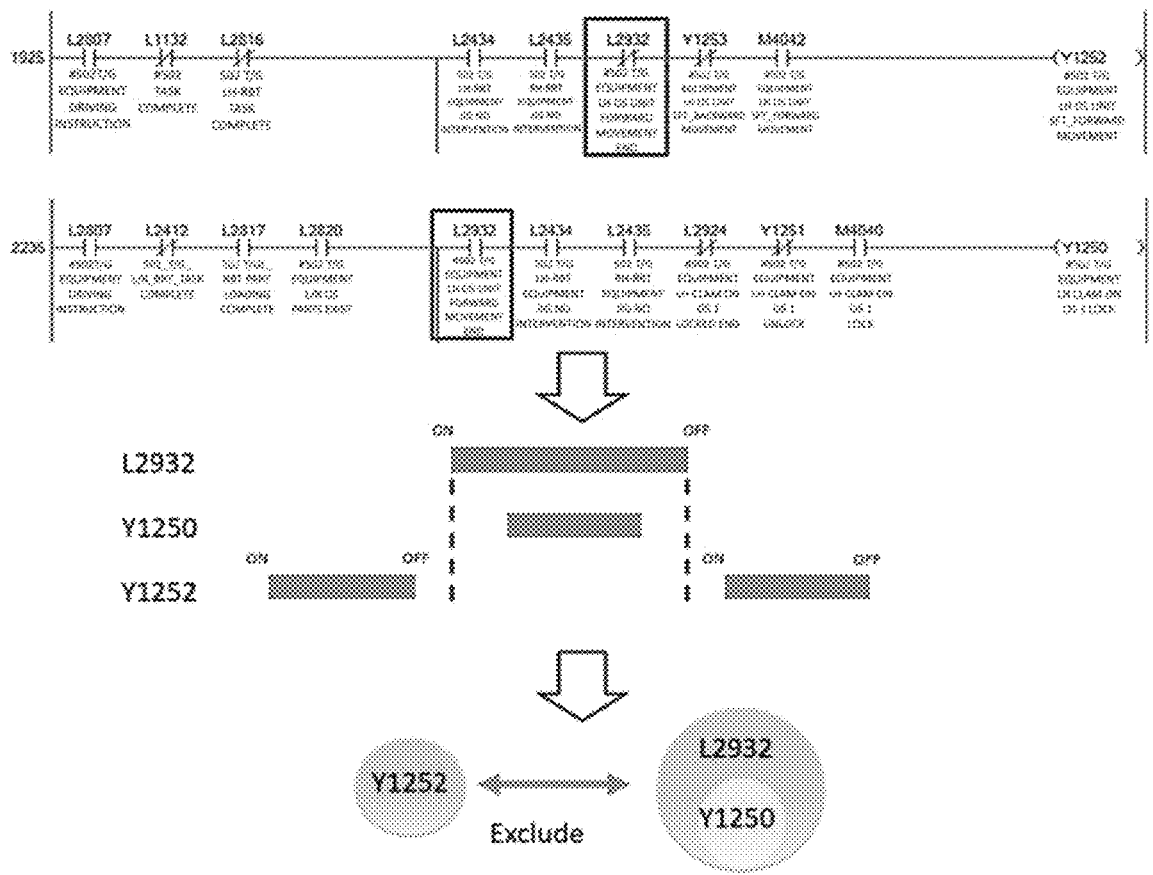
[Fig. 10]
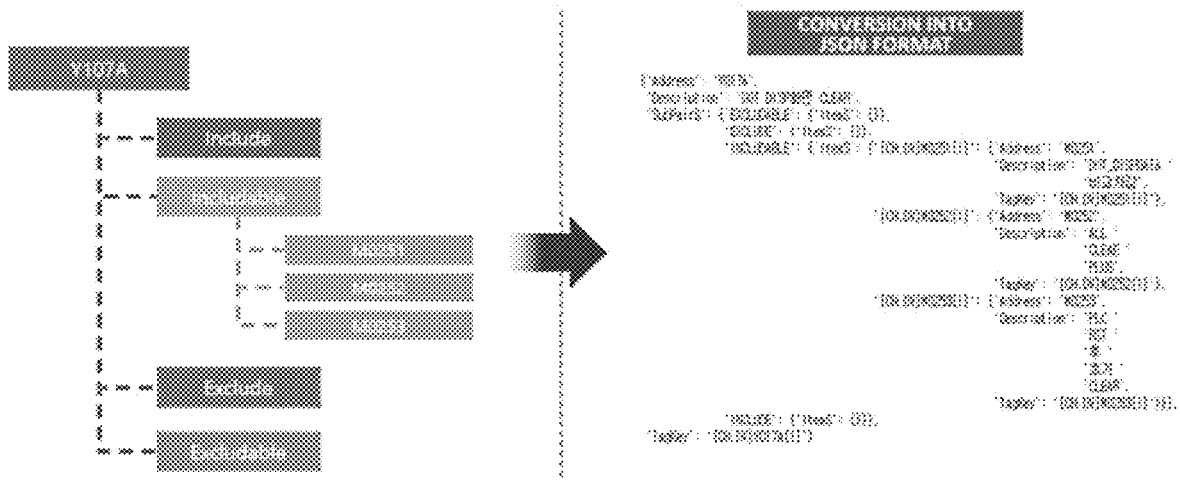

[Fig. 11]
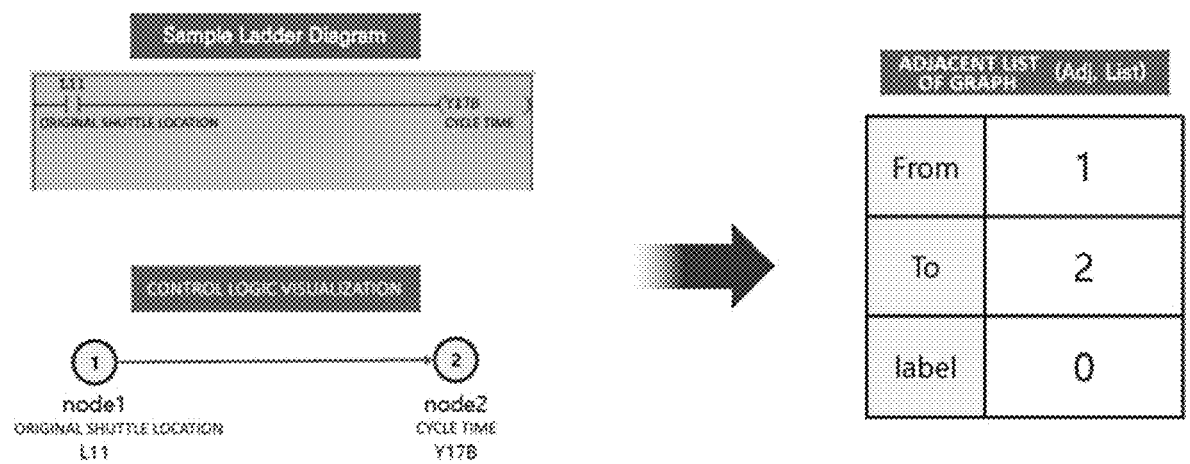
[Fig. 12]
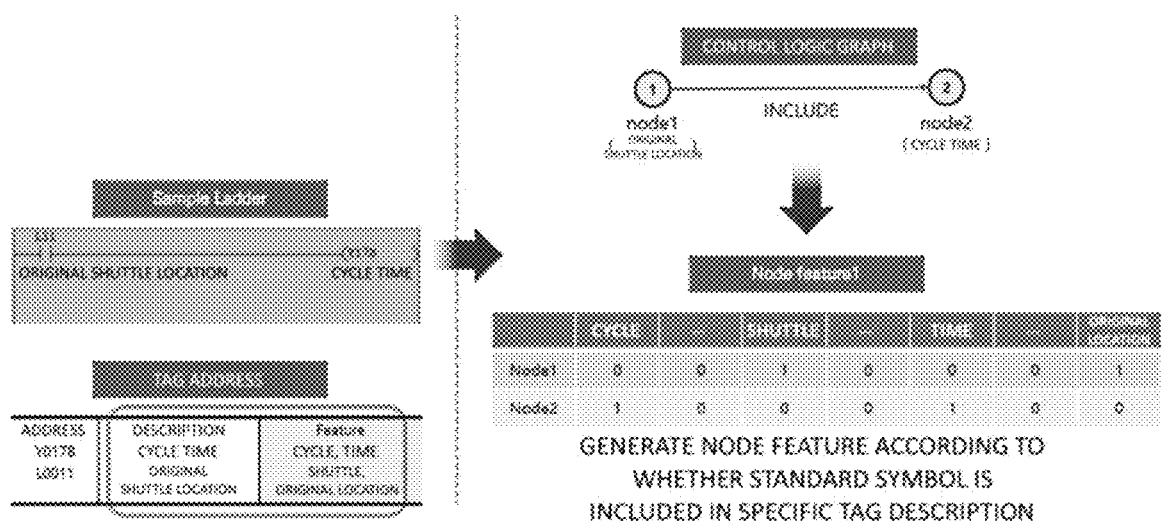
GENERATE NODE FEATURE ACCORDING TO
WHETHER STANDARD SYMBOL IS
INCLUDED IN SPECIFIC TAG DESCRIPTION

[Fig. 13]
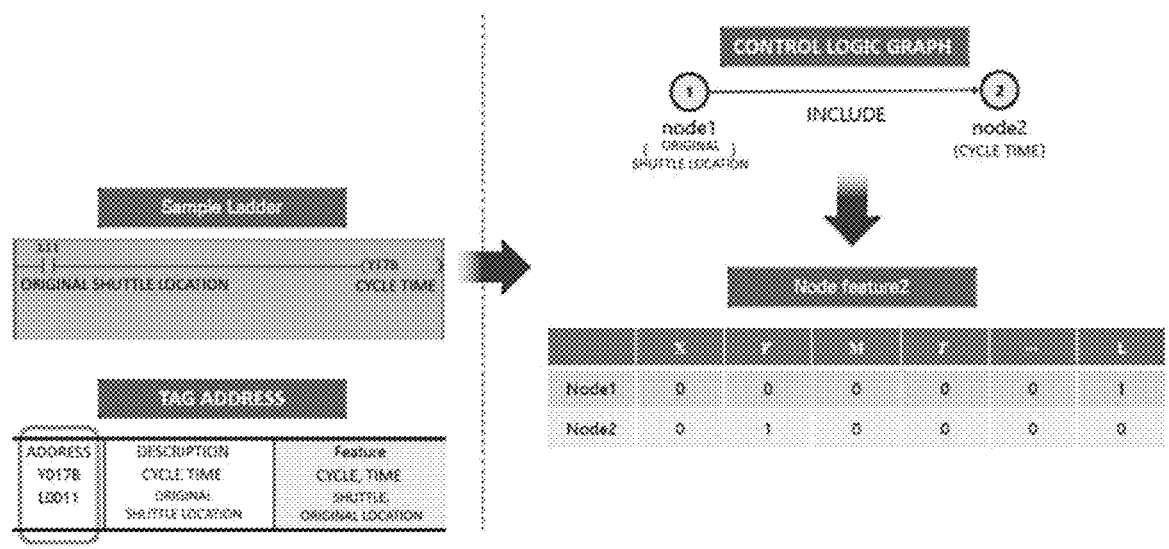
[Fig. 14]
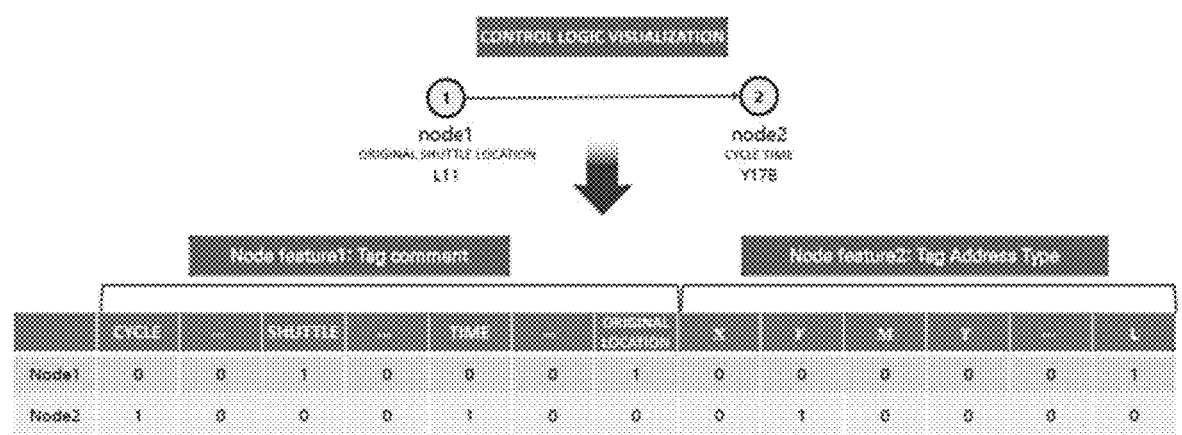

[Fig. 15]
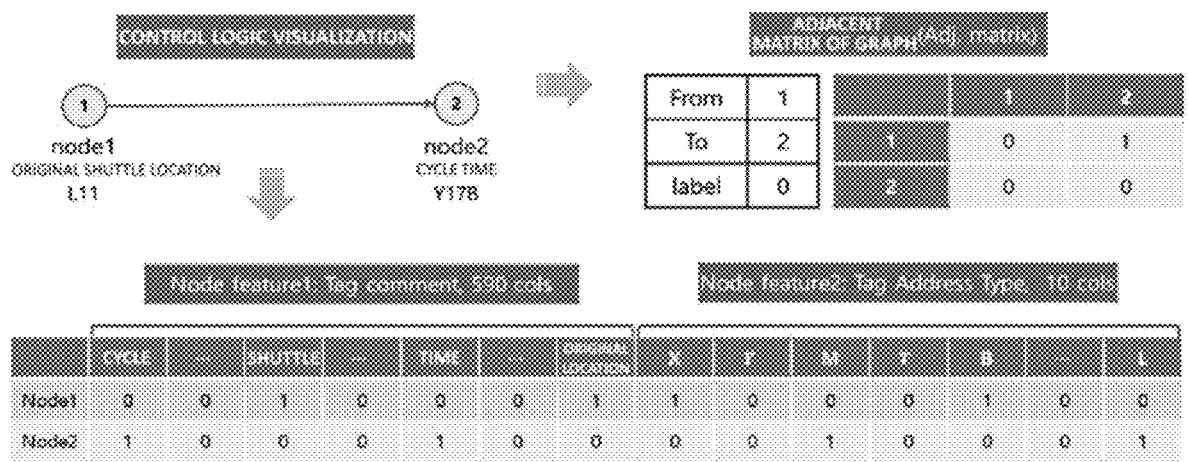
[Fig. 16]
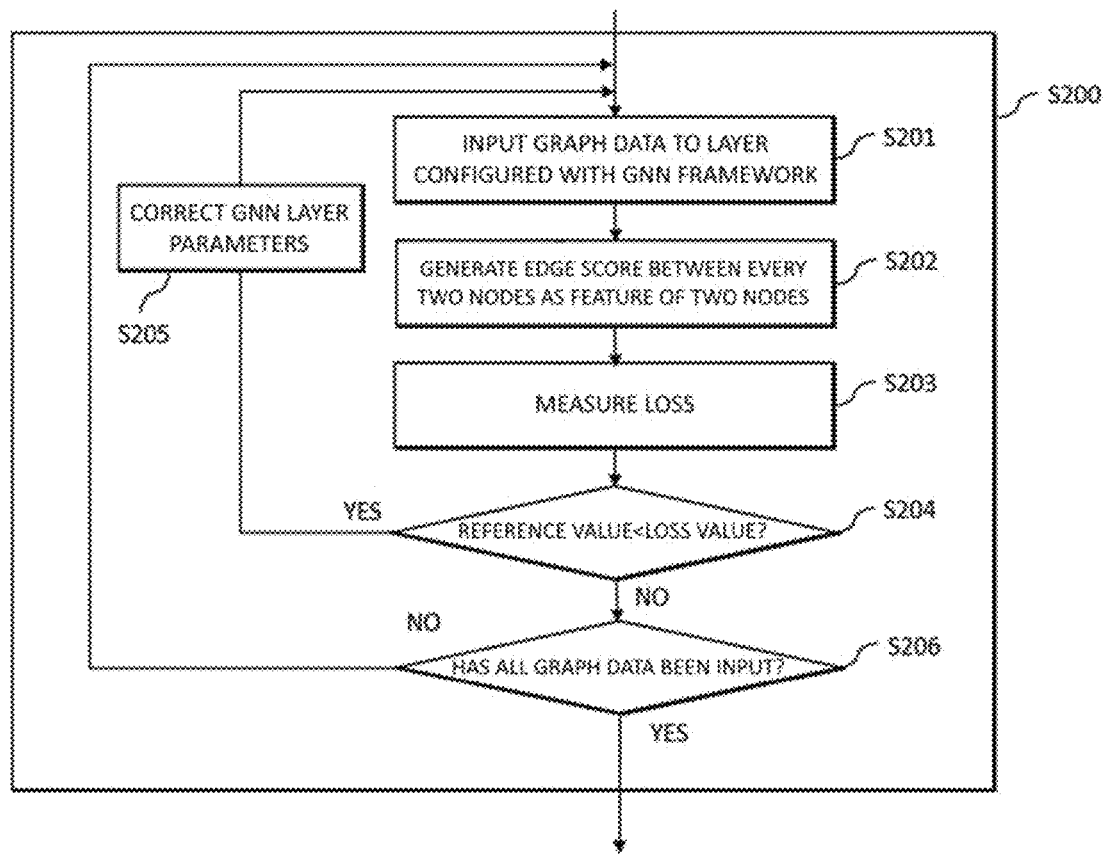

[Fig. 17]
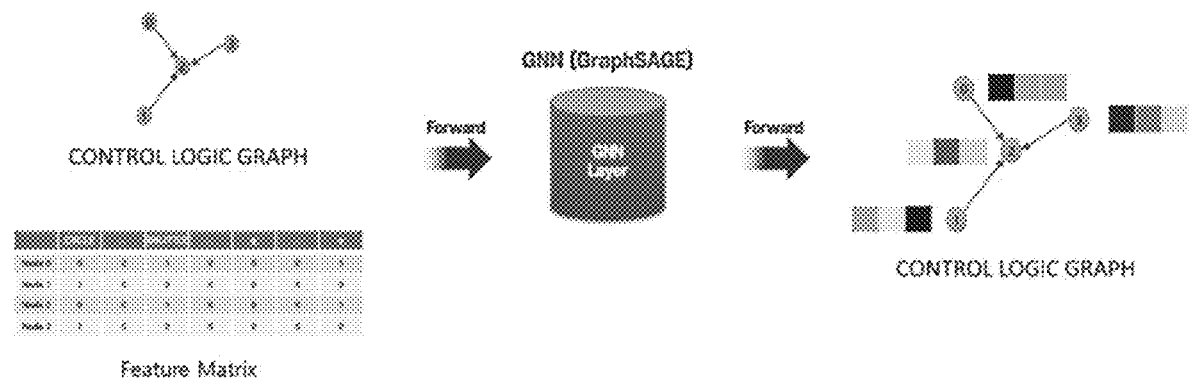
[Fig. 18]
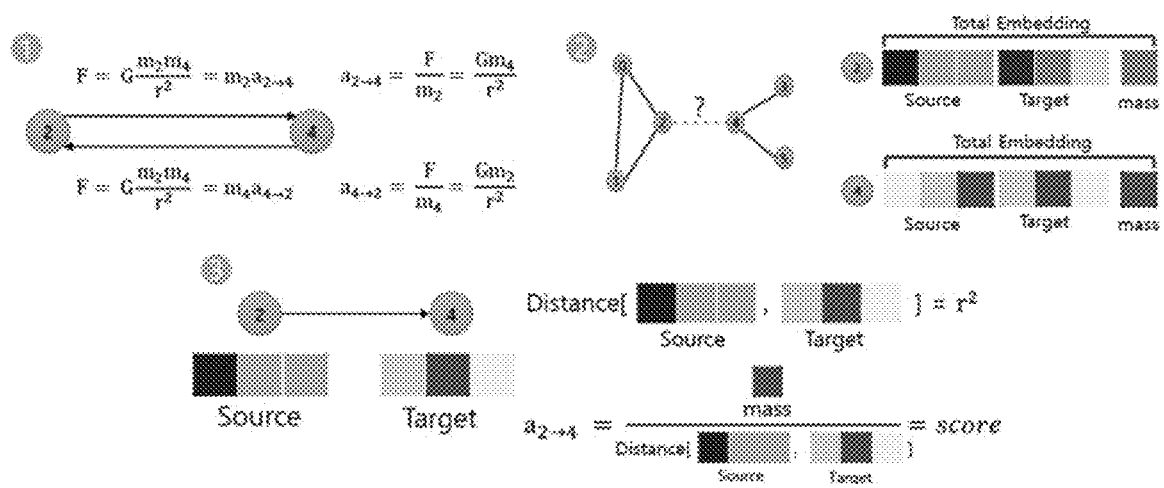
[Fig. 19]
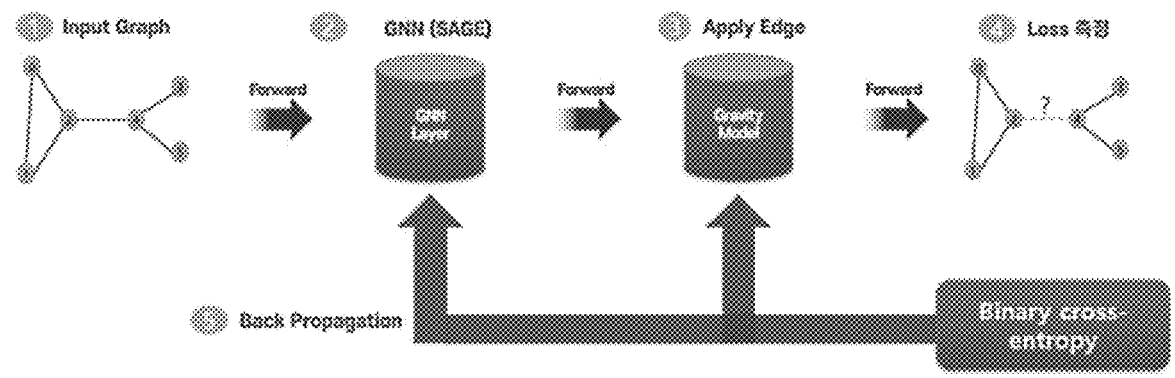

[Fig. 20]
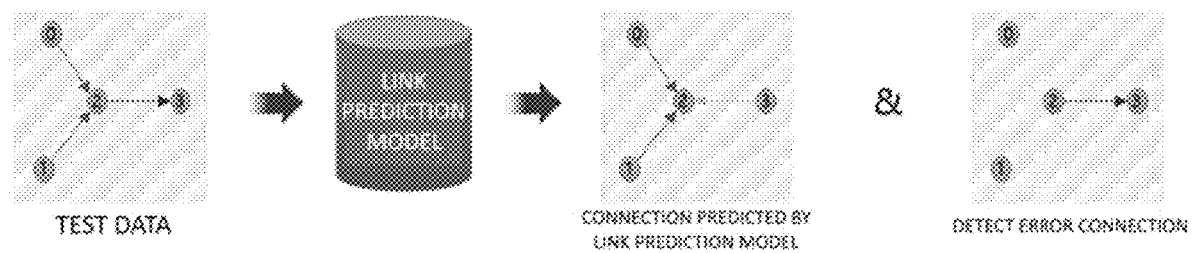

GRAPH NEURAL NETWORK BASED PLC CONTROL LOGIC AUTOMATIC INSPECTION METHOD

TECHNICAL FIELD

The present invention relates to a programmable logic controller (PLC), and more particularly, to inspection of a PLC control logic.

BACKGROUND ART

The content described in this section merely provides background information of embodiments described in this specification and does not necessarily constitute the related art.

A programmable logic controller (PLC) is a highly autonomous control device that can control programs by adding a numerical calculation function to basic sequential control functions (functions of a relay, a timer, a counter, etc. are replaced with a semiconductor device, such as an integrated circuit (IC), a transistor, etc.). For reference, in the National Electrical Manufacturers Association (NEMA), a PLC is defined as a "digitally operating electronic apparatus which uses a programmable memory to implement specific functions, such as logic, sequencing, timing, counting, and arithmetic through digital or analog input/output (I/O) modules, and controls various types of machines or processes."

PLCs are mainly used in building an automated production line and are driven by specifications of a PLC control logic (PLC control logic code) written through operators, such as AND, OR, etc., and relatively simple functions, such as a timer, a function block, etc. Currently, most automated processes are controlled by PLCs.

A PLC program is substantially in charge of control over an automated process, and thus it is crucial to verify the stability and reliability of the program. A current PLC control logic inspection method involves a person directly performing the entire inspection with his or her eyes. This takes a great deal of time and cost, and there is a high probability of errors in the inspection. Also, the test run period of a newly created PLC control logic is short, and there are many control logics to be inspected, which further increases the probability of errors caused by an inspector. Accordingly, to inspect a large number of PLC control logics all within a relatively short period of time until a test run, an automatic inspection method capable of replacing the entire inspection with the eyes according to the related art is necessary.

RELATED ART DOCUMENTS

Non-Patent Documents (Non-patent document 0001) Park Hyeongtae, Hong Sanghyeon, Wang Jinam, Park Sangcheol, (2008) "Plant Model Generation for PLC Simulation," Korean Institute of Industrial Engineers (KIIE) fall conference journal, pp. 278 to 280.

DISCLOSURE

Technical Problem

The present invention is directed to providing a method of automatically inspecting many programmable logic controller (PLC) control logics in a short time.

The present specification is not limited to the above-described object, and other objects which have not been described may be clearly understood by those of ordinary skill in the art from the following descriptions.

Technical Solution

One aspect of the present invention provides a method of automatically inspecting a PLC control logic, the method including a data preprocessing operation in which a processor converts data on a PLC control logic into graph data, a link prediction training operation in which the processor trains a graph neural network (GNN) with the graph data as a model for predicting a link between nodes, and an edge connection suitability verification operation in which the processor inputs the graph data to be inspected to the trained link prediction model and compares the graph data with a calculated prediction graph.

The data preprocessing operation may include (a) receiving, by the processor, data on the PLC control logic represented as a ladder logic, (b) changing, by the processor, comments of tags used in the PLC control logic to standard tag comments, (c) defining, by the processor, relationships between contact points included in the ladder logic, and (d) generating, by the processor, data represented with nodes and edges from the PLC logic.

The data preprocessing operation may further include removing a manual column from the ladder logic and searching for a step of the ladder logic in which a contact point used as an input is used as an output contact point to extend a path.

The relationships between the contact points may be Include, Includable, Exclude, and Excludable.

The operation (c) of the data preprocessing operation may include, when two different contact points have the relationships of Include and Exclude with the same contact point, defining a relationship between the two contact points as Exclude.

The data preprocessing operation may further include (d) generating, by the processor, a feature matrix of the tag comments.

The operation (d) may further include generating, by the processor, a feature matrix of tag address types.

The link prediction training operation may include (a) inputting, by the processor, the graph data to a GNN framework for converting high dimensional data into low dimensional data reflecting features of individual nodes, (b) generating, by the processor, an edge score between every two nodes with features of the two nodes, (c) measuring, by the processor, a loss value between a graph generated using the edge scores and the input graph data, and (d) when the loss value is a preset reference value or more, correcting a parameter in the GNN and repeating the operations (a) to (c).

The operation (b) of the link prediction training operation may include classifying, by the processor, features of each node into source, target, and mass values and calculating an edge score in consideration of directionality between two nodes according to the following equation.

$$a_{k \to 1} = \frac{\text{Mass}_i}{\text{Distnace}[\text{Source}_k, \text{Target}_j]}$$

$$\text{Distance}[\text{Source}_k, \text{Target}_j] = r^2$$

where k and l: two arbitrary nodes between which an edge score will be calculated
Source: a source value in feature data of a node
Target: a target value in feature data of a node
Mass: a mass value in feature data of a node
a: a score indicating whether there is an edge from the node k to the node l The method may be implemented in the form of a computer program that is written for a computer to perform operations of the method and recorded on a computer-readable recording medium.

Other details of the present invention are included in the detailed description and drawings.

Advantageous Effects

According to an aspect of the present invention, it is possible to inspect many PLC control logics in a short time with high accuracy. Features of individual nodes and connections between nodes can be taken into consideration together to determine whether nodes are connected according to directionality. Accordingly, time and cost can be considerably reduced compared to an inspector's inspection with his or her eyes according to the related art.

According to another aspect of the present invention, a GNN can use PLC control logics having different sizes as input data without change while there are restrictions on input data for existing neural networks such as a multilayer perceptron (MLP), a convolutional neural network (CNN), and a recurrent neural network (RNN). Also, a GNN can analyze an input regardless of the size of the input, particularly, the size of a graph. Accordingly, it is possible to use a PLC control logic in which a different number of tags are used without changes.

Effects of the present invention are not limited to the above-described effects, and other effects which have not been described may be clearly understood by those of ordinary skill in the art from the above descriptions.

DESCRIPTION OF DRAWINGS

FIG. 1 is a schematic flowchart of a method of automatically inspecting a programmable logic controller (PLC) control logic according to the present specification;

FIG. 2 is a flowchart of a data preprocessing method for automatically inspecting a PLC control logic according to the present specification;

FIG. 3 is a reference diagram illustrating terminology of a PLC ladder;

FIG. 4 is a set of exemplary tables of tag comments and standard comments;

FIG. 5 is a set of exemplary tables in which existing tag comments are changed through a tag comment standardization task;

FIGS. 6 and 7 are reference diagrams for defining relationships between contact points included in a ladder logic;

FIG. 8 is a reference diagram for extending a path;

FIG. 9 is a reference diagram for extending a relationship between contact points;

FIGS. 10 to 15 are exemplary diagrams of graph data conversion of a PLC control logic;

FIG. 16 is a flowchart of a method of training a graph neural network (GNN) link prediction model according to the present specification;

FIG. 17 is a reference diagram in which feature matrix data is input to a GNN layer configured with GraphSAGE and an embedding value is generated;

FIG. 18 is a reference diagram illustrating edge score calculation according to the present specification;

FIG. 19 is an overall flowchart of a link prediction training operation according to the present specification; and FIG. 20 is a reference diagram of GNN edge connection suitability verification.

MODES OF THE INVENTION

Advantages and features of the present invention disclosed herein and methods of achieving the same will be made clear by referring to exemplary embodiments described in detail below with reference to the accompanying drawings. However, the present specification is not limited to the exemplary embodiments disclosed below and may be implemented in various different forms. The exemplary embodiments are only provided so that the disclosure of the present specification will be thoroughly described and fully convey the scope of the present specification to those of ordinary skill in the art. The scope of the present specification is only defined by the scope of the claims.

Terms used herein are intended to describe the exemplary embodiments and not to limit the scope of the present specification. In this specification, the singular forms include the plural forms as well unless the context clearly indicates otherwise. As used herein, the terms "comprise" and/or "comprising" do not preclude the presence or addition of one or more components other than stated components.

Throughout the specification, like reference numerals refer to like elements. "And/or" includes each of stated components and all combinations of one or more thereof. Although "first," "second," etc. are used for describing various components, the components are not limited thereto. These terms are used for merely distinguishing one component from another. Accordingly, a first component stated below may be a second component within the technical spirit of the present invention.

Unless otherwise defined, all terms (including technical and scientific terms) used herein have the same meanings as commonly understood by those skilled in the technical field to which the present specification pertains. Also, terms defined in commonly used dictionaries will not be interpreted in an idealized or overly formal sense unless clearly so defined herein.

Hereinafter, a method of automatically inspecting a programmable logic controller (PLC) control logic according to the present specification will be described with reference to the accompanying drawings. Meanwhile, each operation of the method to be described below may be performed by a processor.

FIG. 1 is a schematic flowchart of a method of automatically inspecting a PLC control logic according to the present specification.

Referring to FIG. 1, the method of automatically inspecting a PLC control logic according to the present specification may generally include a data preprocessing operation (S100), a graphic neural network (GNN) link prediction model training operation (S200), and a GNN edge connection suitability verification operation (S300). A process performed in each operation will be separately described.

<Data Preprocessing>

In the data preprocessing operation (S100), the processor converts data on a PLC control logic into graph data.

FIG. 2 is a flowchart of a data preprocessing method for automatically inspecting a PLC control logic according to the present specification.

Referring to FIG. 2, in operation S101, the processor may receive data on a PLC control logic which is represented as a ladder logic. A control program used in a PLC is a ladder logic which is main linguistic methodology.

FIG. 3 is a reference diagram illustrating terminology of a PLC ladder.

Referring to FIG. 3, in a ladder logic shown as an example, a plurality of contact points L2406, L2577, L2405, L2409, Y6A3, etc. are connected as a path. There is a set of specific conditions of input contact points ②) for turning on an output contact point ③). Such a logical formula for turning on the output contact point is referred to as step ①. A contact point that is generally kept in an off state and switched to an on state is referred to as an A contact point ④, and a contact point that is generally kept in an on state and switched to an off state is referred to as a B contact point ⑤. "AND" conditions are shown in one path, and "OR" conditions are shown in different paths. In the example shown in FIG. 3, there are three paths: the path "(1) L2406 & L2577 & !B2250 & B2251 & M3903 & !L2503 & !Y6A2," the path "(2) L2405 & L2472 & X658 & !X659 & M3903 & !L2503 & !Y6A2," and the path "(3) L2409 & M3903 & !L2503 & !Y6A2."

Referring back to FIG. 2, in operation S102, the processor may standardize tag comments. A tag comment is the meaning of a contact point described by a PLC programmer. Tag comment standardization involves changing the comment of a tag used in a PLC control logic to a standard tag comment. Since PLC programmers may represent the same meaning with different words, tag comment standardization is intended to unify these expressions.

Figures 4, 5:
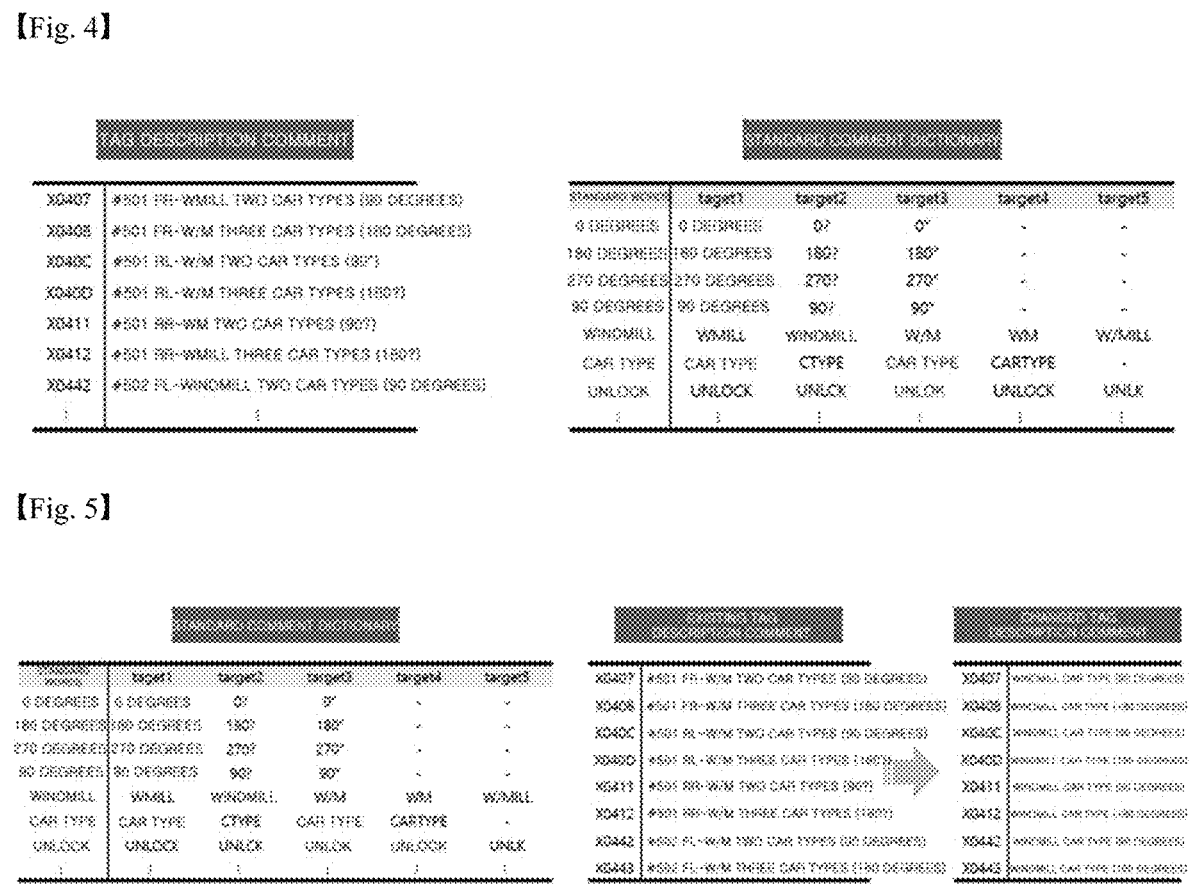

FIG. 4 is a set of exemplary tables of tag comments and standard comments.

Referring to FIG. 4, for example, in the case of writing the comment "windmill" in an arbitrary PLC tag, a programmer A may write "WMILL," and a programmer B may write "W/M." In this case, since the programmers A and B want to write comments having the same meaning, "WMILL" and "W/M" may be replaced with "windmill" which is set as a standard word. A standard comment dictionary may be prepared in advance.

FIG. 5 is a set of exemplary tables in which existing tag comments are changed through a tag comment standardization task.

Referring to FIG. 5, when tag comments are made with common expressions through a tag comment standardization task regardless of PLC programmers, it is possible to facilitate tag management and analysis.

Referring back to FIG. 2, in operation S103, the processor may define a relationship between contact points included in the ladder logic.

FIGS. 6 and 7 are reference diagrams for defining relationships between contact points included in a ladder logic.

Referring to FIGS. 6 and 7, one step proposed as an example may be checked. Before a relationship between contact points is defined, a manual column may be removed as an unnecessary path for an automated process.

Relationships between contact points included in the step may be "Include," "Includable," "Exclude," and "Excludable." "Include" is a tag used as an A contact point in all paths thereof. "Includable" is a tag used as an A contact point in any of paths thereof. "Exclude" is a tag used as a B contact point in all paths thereof. "Excludable" is a tag used as a B contact point in any of paths thereof. The tag is an arbitrary contact point for defining a relationship between contact points.

Meanwhile, an A contact point included in any one step may be used as an output contact point in another step. In this case, it is necessary to extend a path for finding a relationship between contact points not only to a path in the step but also to the other step in which the contact point is used as an output contact point.

FIG. 8 is a reference diagram for extending a path.

Referring to FIG. 8, a step in which a contact point used as an input in a ladder logic is used as an output contact point is detected in a ladder logic such that a path is extended.

Meanwhile, in the contact point relationship defining operation, a one-to-one relationship may be defined between contact points, and the defined relationship may be extended to a relationship between other contact points.

FIG. 9 is a reference diagram for extending a relationship between contact points.

Referring to FIG. 9, when two different contact points (e.g., Y1250 and Y1252) have the same contact point (e.g., L2932) as "Include" and "Exclude," respectively, a relationship between the two different contact points may be defined as "Exclude."

Referring back to FIG. 2, in operation S104, the processor may convert the PLC control logic into graph data. Graph data is data having a structure including nodes and edges. The processor according to the present specification may generate graph data that represents tags of the PLC control logic as nodes and represents connections between the tags as edges.

FIGS. 10 to 15 are exemplary diagrams of a graph data conversion of a PLC control logic.

First, the processor may convert the PLC control logic into the JSON format. Referring to FIG. 10, an example shows that a PLC control logic in which relationships between contact points are defined is converted into the JSON format. The processor may generate edge indices of the PLC control logic. Referring to FIG. 11, when a contact point L11 is represented as Node 1 and a contact point Y17B is represented as Node 2, an example of an edge index in graph data is shown. In FIG. 11, 0 in "label" is a value representing the relationship "Include." For example, a value of 0 to 3 may be input to "label." "0," "1," "2," and "3" may represent the relationships "Include," "Includable," "Exclude," and "Excludable," respectively. Also, the processor may generate a feature matrix of tag comments. Referring to FIG. 12, a feature matrix is generated according to whether standard words included in a standardized tag comment are included. For example, a standardized tag comment of a contact point Y017B is "cycle time," in which standard words "cycle" and "time" are used. Accordingly, in a feature matrix of Node 2, only values corresponding to "cycle" and "time" may be "1," and all other values may be "0."

According to an exemplary embodiment of the present specification, the processor may additionally generate a feature matrix of tag address types. Referring to FIG. 13, a tag address portion includes type information (e.g., Y, L, X, etc.) according to a feature of a contact point. The processor may extract a tag address portion and generate information on a tag address type in a one-hot-encoding format. Referring to FIG. 14, an example shows a matrix including a feature of a tag comment and information on a tag address type regarding each node. As an example, the feature of a tag comment is whether any of 580 words is included, and the information on a tag address type is whether the tag address type corresponds to any of 10 types, that is, 590 dims in total.

In brief, in operation S104, the PLC control logic may be converted into graph data as illustrated in FIG. 15. As described above, through the preprocessing operation of converting a PLC control logic into graph data, a model can be trained using unique tag features as well as connection information between tags as inputs such that the performance of the model can be improved. The feature matrix includes tag comments representing a detailed role of each node in a natural language and address types representing attributes of tags in the PLC. Such a feature matrix may be the main basis for determining whether to connect tags.

Training of GNN Link Prediction Model

In the GNN link prediction model training operation (S200), the processor trains a GNN as a model for predicting a link between nodes using graph data obtained through a preprocessing operation. Since the graph data obtained through the data preprocessing operation according to the present specification includes a feature matrix of tag comments, this is an operation of training a GNN as a model for predicting whether there is a substantial connection between tags.

FIG. 16 is a flowchart of a method of training a GNN link prediction model according to the present specification.

Referring to FIG. 16, in an operation S201, the processor may input the graph data to a GNN framework for converting high dimensional data into low dimensional data reflecting features of individual nodes. The graph data may be input to a GNN layer that is configured with a GraphSAGE framework as an example of the GNN framework. In GraphSAGE, SAGE is a combination of SAmple and aggreGatE. The GraphSAGE is a GNN framework that samples neighboring nodes and aggregates hidden states of the sampled neighboring nodes in a specific way (mean, maxpooling, meanpooling, or attention) to generate an embedding (or hidden state) value of a specific node. The content described in "William L. Hamilton, Rex Ying, and Jure Leskovec. 2017. Inductive representation learning on large graphs. In the International Conference on Neural Information Processing Systems (NIPs). 1024-1034" can be referred to for information on the GraphSAGE framework. GraphSAGE may generate a node embedding value in a local domain and thus may perform inductive learning. Accordingly, even when a new node is generated, an existing model may be used.

FIG. 17 is a reference diagram in which feature matrix data is input to a GNN layer configured with GraphSAGE and an embedding value is generated.

Referring to FIG. 17, graph data of a PLC control logic includes information on connections between nodes and information on a tag feature matrix. When such data is input to GraphSAGE, GraphSAGE may update a feature of a specific node by integrating features of neighboring nodes in a specific manner. As a result, an embedding value for each node may be derived through the GNN layer.

Meanwhile, data input to the GNN framework according to the present specification is configured as a feature matrix by adding connection information between nodes (graph connection information) and features of individual nodes together. The graph connection information is represented as an adjacent matrix or a coordinate matrix. The adjacent matrix is a sparse matrix in which most of the elements are 0. Also, among node features, a feature in a one-hot encoding format, such as an address type, includes many zeros. When such input data is used as it is, an unnecessary amount of computation increases. Accordingly, it is necessary to reduce the unnecessary amount of computation while reflecting features of individual nodes as much as possible.

To this end, the GNN framework according to the present specification serves as a model that converts information on connections between nodes in high dimensional node feature matrix data into low dimensional node embedding values. The generated low dimensional embedding values have a reduced data size (dimensions) compared to input data but include connection information between nodes and features of individual nodes. Accordingly, the low dimensional embedding values are considered as implicatively having all information of the input data. In the above description, GraphSAGE has been proposed as an example of the GNN framework, but several embodiments of a graph convolutional network (GCN), a graph attention network (GAT), a variational graph autoencoder (VGAE), a graph isomorphism network (GIN), etc. are possible. Therefore, the GNN framework according to the present specification is not limited to a specific model and may correspond to any of various models that generate data reflecting features of nodes from input data while reducing dimensions of the input data.

Referring back to FIG. 16, in the next operation S202, the processor may generate an edge score between every two nodes as a feature of the two nodes. Here, "the feature of the two nodes" may be an embedding value for each node derived through the GNN layer.

The edge score is a probability that there will be an edge between two nodes. According to graph theory, when two arbitrary nodes are connected by one edge, the two nodes are adjacent to each other. In terms of the edge, the edge is incident to the two nodes. Accordingly, whether there will be an edge between two arbitrary nodes may be determined by comparing or analyzing the two nodes. Here, the probability that there will be an edge may be calculated as an "edge score."

According to an exemplary embodiment of the present specification, the processor may classify features of each node into source, target, and mass values and calculate an edge score in consideration of directivity between two nodes using the following equation.

$$a_{k \to 1} = \frac{\text{Mass}_l}{\text{Distnace}[\text{Source}_k, \text{Target}_l]} \quad \text{[Equation]}$$

$$\text{Distance}[\text{Source}_k, \text{Target}_l] = r^2$$

k and l: two arbitrary nodes between which an edge score will be calculated
Source: a source value in feature data of a node
Target: a target value in feature data of a node
Mass: a mass value in feature data of a node
a: a score indicating whether there is an edge from the node k to the node l A model for calculating the edge score is a model generated on the basis of the gravitational equation.

FIG. 18 is a reference diagram illustrating edge score calculation according to the present specification.

Referring to FIG. 18, the gravitational equation may be seen in ①. When the gravitational equation is rearranged with respect to acceleration, acceleration caused by force generated by gravity between two objects with mass may be found. When acceleration is calculated for each object, the magnitude and direction of force may be found. For this very reason, as shown in ②, feature values, preferably embedded feature values, of each node may be classified into source, target, and mass values. Here, source, target, and mass magnitudes may vary and be set arbitrarily. When an acceleration from a node number 2 to a node number 4 is calculated as illustrated in ③, a score indicating a probability that there will be an edge from the node number 2 to the node number 4 may be calculated. Here, a distance from a source and a target may be calculated as a distance between vectors. For example, when the edge score from the node number 2 to the node number 4 is calculated to be high, there is a high probability that an edge will be present. On the other hand, when the edge score from the node number 4 to the node number 2 is calculated to be low, there is a low probability that an edge from the node number 4 to the node number 2 will be present. In other words, the edge score calculation method according to the present specification may learn not only a positive graph that there will be an actual connection but also a negative graph that there will not be an actual connection. As a result, it is possible to perform directed graph link prediction using both the positive graph and the negative graph.

Referring back to FIG. 16, in the next operation S203, the processor may measure loss values between a graph generated using the edge scores and the input graph data. A loss value is a difference value between a calculated edge score and 1 when there is an edge in the input graph data or 0 when there is no edge. For example, when there is an edge in the input graph data and a calculated edge score is 0.7, the loss value is 0.3. Here, a calculated loss value is a preset reference value or more (Yes in operation S204), parameters included in the GNN layer may be corrected (operation S205), and the operations S201 to S204 may be performed again. Meanwhile, the process of measuring a loss value has been briefly described to help understanding, and a loss value may also be calculated using a "binary cross entropy" method. Various loss value calculation methods which are readily applicable at the level of those of ordinary skill in the art may be applied to the present specification, and the technical spirit of the present specification is not limited to the example.

FIG. 19 is an overall flowchart of a link prediction training operation according to the present specification.

Referring to FIG. 19, training a link prediction model through backpropagation may be understood. The above process may be repeated until all the prepared input graph data is input (operation S206 in FIG. 16). An automatic PLC control logic inspection model is prepared through the above process.

GNN Edge Connection Suitability Verification

In the GNN edge connection suitability verification operation (S300), the processor inputs the graph data to be inspected to the trained link prediction model and compares the graph data with a calculated prediction graph. In other words, it is determined whether there is an error connection between the input data and the prediction data.

FIG. 20 is a reference diagram of GNN edge connection suitability verification.

Referring to FIG. 20, there is an edge from a node number 2 to a node number 3 in graph data to be inspected (test data), and there is an edge from the node number 3 to the node number 2 in a graph generated by the link prediction model. Accordingly, in the graph data to be inspected (test data), the edge between the node number 2 and the node number 3 may be determined as an error connection.

The processor may include a microprocessor, an application-specific integrated circuit (ASIC), another chipset, a logic circuit, a register, a communication modem, a data processing device, etc. which are well known in the art to perform the above-described computation and execute various control logics. Also, when the above-described logic is implemented as software, the processor may be implemented as a set of program modules. In this case, the program modules may be stored in a memory and executed by the processor.

In order for a computer to read a program and perform the above methods implemented as the program, the program may include code coded in a computer language readable by a processor (a central processing unit (CPU)) of the computer through a device interface of the computer, such as C/C++, C #, JAVA, Python, machine language, etc. The code may include functional code related to functions that define necessary functions for performing the methods and include control code related to an execution procedure necessary for the processor of the computer to execute the functions according to a predetermined procedure. Also, the code may further include additional information required for the processor of the computer to execute the functions or code related to memory reference to which a location (address) of an internal or external memory of the computer should be referenced. Further, when the processor of the computer is required to communicate with any other computer or server at a remote location to execute the functions, the code may further include code related to communication for how to communicate with any other computers or servers at remote locations using a communication module of the computer and for what information or media should be transmitted and received during communication.

A storage medium is not a medium in which data is stored for a short moment, such as a register, a cache, a memory, etc., but is a medium in which data is stored semi-permanently and is readable by a device. Specifically, examples of the storage medium include a ROM, a RAM, a CD-ROM, magnetic tape, a floppy disk, an optical data storage device, etc. but are not limited thereto. In other words, the program may be stored in various recording media on various servers that are accessible by the computer or may be stored in various recording media of a user's computer. Also, the media may be distributed over computer systems connected through a network, and computer-readable code may be stored in a distributed manner.

The invention claimed is:

1. A method of automatically inspecting a programmable logic controller (PLC) control logic, the method comprising:
   a data preprocessing operation in which a processor converts data on a PLC control logic into graph data which represents tags of the PLC control logic as nodes and represents connections between the tags as edges;
   a link prediction training operation in which the processor trains a graph neural network (GNN) with the graph data as a model for predicting a link between the nodes; and
   an edge connection suitability verifying operation in which the processor inputs the graph data to be inspected to the trained link prediction model and compares the graph data with a calculated prediction graph to locate an incorrect connection in the PLC control logic,
   wherein the data preprocessing operation comprises:
     (a) receiving, by the processor, data on the PLC control logic represented as a ladder logic;

(b) changing, by the processor, comments of tags used in the PLC control logic to standard tag comments based on a predefined standard comment dictionary;

(c) defining, by the processor, relationships between contact points included in the ladder logic; and (d) generating, by the processor, the graph data represented with the nodes and the edges from the PLC logic.

2. The method of claim 1, wherein the data preprocessing operation further comprises removing a manual column from the ladder logic and searching for a step of the ladder logic in which a contact point used as an input is used as an output contact point to extend a path.

3. The method of claim 1, wherein the relationships between the contact points are Include, Includable, Exclude, and Excludable.

4. The method of claim 3, wherein the operation (c) comprises, when two different contact points have the relationships of Include and Exclude with the same contact point, defining a relationship between the two contact points as Exclude.

5. The method of claim 1, wherein the data preprocessing operation further comprises (d) generating, by the processor, a feature matrix of the tag comments.

6. The method of claim 5, wherein the operation (d) further generates, by the processor, a feature matrix of tag address types.

7. The method of claim 1, wherein the link prediction training operation comprises:

(a) inputting, by the processor, the graph data to a GNN framework for converting high dimensional data into low dimensional data reflecting features of individual nodes;

(b) generating, by the processor, an edge score between every two nodes with features of the two nodes;

(c) measuring, by the processor, a loss value between a graph generated using the edge scores and the input graph data; and (d) when the loss value is a preset reference value or more, correcting a parameter in the GNN and repeating the operations (a) to (c).

8. The method of claim 7, wherein the operation (b) comprises classifying, by the processor, features of each node into source, target, and mass values and calculating an edge score in consideration of directionality between two nodes according to equation:

$$a_{k \to 1} = \frac{\text{Mass}_i}{\text{Distnace}[\text{Source}_k, \text{Target}_j]}, \text{ and}$$

$$\text{Distance}[\text{Source}_k, \text{Target}_j] = r^2,$$

where k and l: two arbitrary nodes between which an edge score will be calculated, Source: a source value in feature data of a node, Target: a target value in feature data of a node, Mass: a mass value in feature data of a node, and a: a score indicating whether there is an edge from the node k to the node l.

9. A non-transitory computer-readable medium storing instructions to be executed by a computer to perform the method of claim 1.

* * * * *